US011416557B2

(12) United States Patent
Stokes

(10) Patent No.: US 11,416,557 B2
(45) Date of Patent: Aug. 16, 2022

(54) SYSTEM AND METHOD TO IDENTIFYING NETWORK APPLIANCES BY DATA ENDPOINTS

(71) Applicant: WINSTON PRIVACY, Chicago, IL (US)

(72) Inventor: Richard Stokes, Glenview, IL (US)

(73) Assignee: ACTION STREAMER, LLC, Cincinnati, OH (US)

( * ) Notice: Subject to any disclaimer, the term of this patent is extended or adjusted under 35 U.S.C. 154(b) by 169 days.

(21) Appl. No.: 17/002,865

(22) Filed: Aug. 26, 2020

(65) Prior Publication Data
US 2022/0067103 A1   Mar. 3, 2022

(51) Int. Cl.
*G06F 16/903* (2019.01)
*G06F 16/16* (2019.01)
*H04L 45/745* (2022.01)

(52) U.S. Cl.
CPC ...... *G06F 16/90335* (2019.01); *G06F 16/164* (2019.01); *H04L 45/745* (2013.01)

(58) Field of Classification Search
CPC . G06F 16/90335; G06F 16/164; H04L 45/745
See application file for complete search history.

(56) References Cited

U.S. PATENT DOCUMENTS 7,890,637 B1 * 2/2011 Zhang ............... H04L 67/141
709/227
2021/0112607 A1 * 4/2021 Takagi ............... H04L 12/4633

* cited by examiner

*Primary Examiner* — William B Partridge
*Assistant Examiner* — Lahcen Ennaji
(74) *Attorney, Agent, or Firm* — Panitch Schwarze Belisario & Nadel LLP

(57) ABSTRACT

A method, system, and computer program product for identifying network appliances on a network which includes a processor configured to intercept network communications from one or more devices on a first network in communication with a second network. The processor may store information about each communication in a database, the information including a Client Id and a destination address. The processor may query the database for a list of all destination addresses which were attempted to be contacted for each Client Id and generate metadata for each Client Id. The processor may analyze each Client Id, the associated metadata for each Client Id, and the destination addresses associated with each Client Id using one or more rules in a device identification tree and assign a device label to each Client Id of the one or more devices.

20 Claims, 4 Drawing Sheets

SYSTEM AND METHOD TO IDENTIFYING NETWORK APPLIANCES BY DATA ENDPOINTS

FIELD

The present disclosure relates to the improvement of detecting devices on a local network.

BACKGROUND

With the increasing number of computing devices, including smart devices, internet of things devices, etc., being used on local networks, such as home Wi-Fi networks, network security is more important than ever. An important step in any network security policy or protocol is identifying the computing devices on the local network. Traditionally, identification of network devices is done using one or the following methods: identification of manufacturer by MAC Address lookup, such as might be collected with Nmap (Network Mapper, an open-source tool for vulnerability scanning and network discovery); identification via the host name via reverse IP lookup; collection of device provided host names; and/or network discovery protocols, such as Apple's Bonjour, which locates devices and the services that those devices offer on a local network using multicast Domain Name System (m DNS) service records) or Avahi, which facilitates service discovery on a local network via the mDNS/DNS-SD protocol suite. However, these traditional methods for network device identification has several disadvantages including inaccuracy, yielding incomplete lists of devices, failure to detect new devices, and/or requiring devices to implement an agreed upon protocol. As such, there is a need for more accurate and robust methods and systems for identifying computing devices on a local network, including potentially adversarial or uncooperative devices.

SUMMARY

The present disclosure provides a description of exemplary methods, systems, and computer program products for identifying network appliances on a network. The methods, systems, and computer program products may include a processor which can intercept network communications from one or more devices between a first network and a second network and store the information about each connection in a database. The information may include a Client Id and a destination address. The processor may query the database for a list of all destination addresses which were attempted to be contacted for each Client Id and generate metadata for each Client Id. The processor may analyze each Client Id, the associated metadata for each Client Id, and the destination addresses associated with each Client Id using a device identification tree, the device identification tree having one or more rules, the one or more rules defining a set of conditions to identify the one or more devices. The processor may assign a device label to the Client Id of the one or more devices on the first network based on the one or more Client Ids matching all conditions of one or more of the rules in the device identification tree.

BRIEF DESCRIPTION OF THE DRAWING FIGURES

The scope of the present disclosure is best understood from the following detailed description of exemplary embodiments when read in conjunction with the accompanying drawings, Included in the drawings are the following figures.

Figure 4:
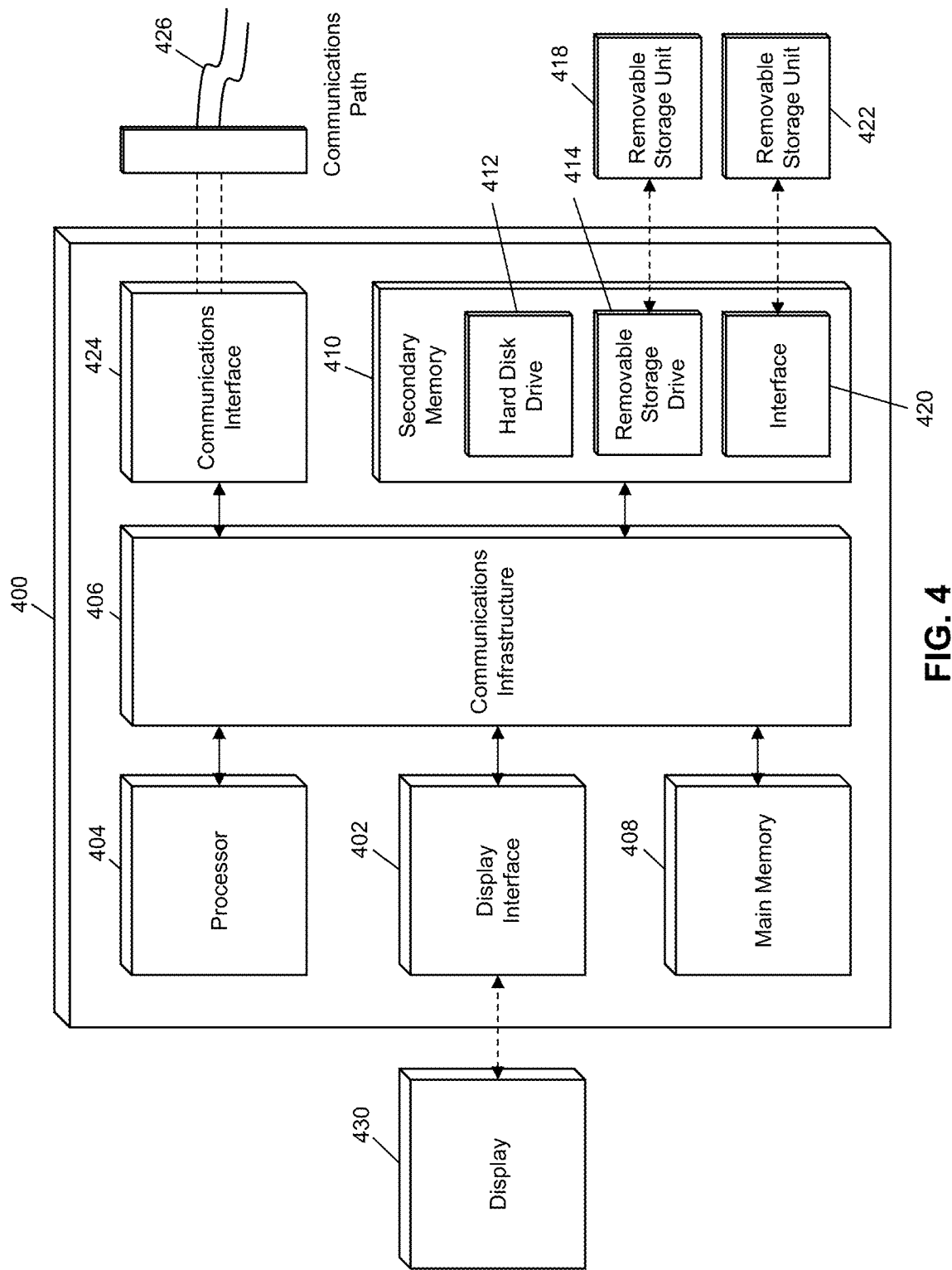

FIG. 4 is a block diagram illustrating computer system architecture in accordance with exemplary embodiments Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

The present disclosure provides a novel solution for identifying network appliances on a network by data endpoints. Traditional approaches for identifying computing devices on a network include identification of device manufacturer by MAC Address lookup, such as might be collected with Nmap; identification via the host name via reverse IP lookup; collection of device provided host names; and/or network discovery protocols, such as Bonjour or Avahi. However, these traditional approaches for identifying computing devices on a network have several disadvantages including inaccuracy, yielding incomplete lists of devices, failure to detect new devices, and/or requiring devices to implement an agreed upon protocol. The methods and systems herein provide a novel solution, not addressed by current technology, for identifying computing devices by data endpoints determined by intercepting network communications from the computing devices. In exemplary embodiments of the methods and systems provided for herein, a monitoring device intercepts network communications and then analyzes those communications utilizing a device identification tree populated with rules. Thus, the methods and systems herein provide a novel, flexible, and more accurate means of identifying specific devices on a network.

System for Identifying Network Appliances by Data Endpoints

Figure 1:
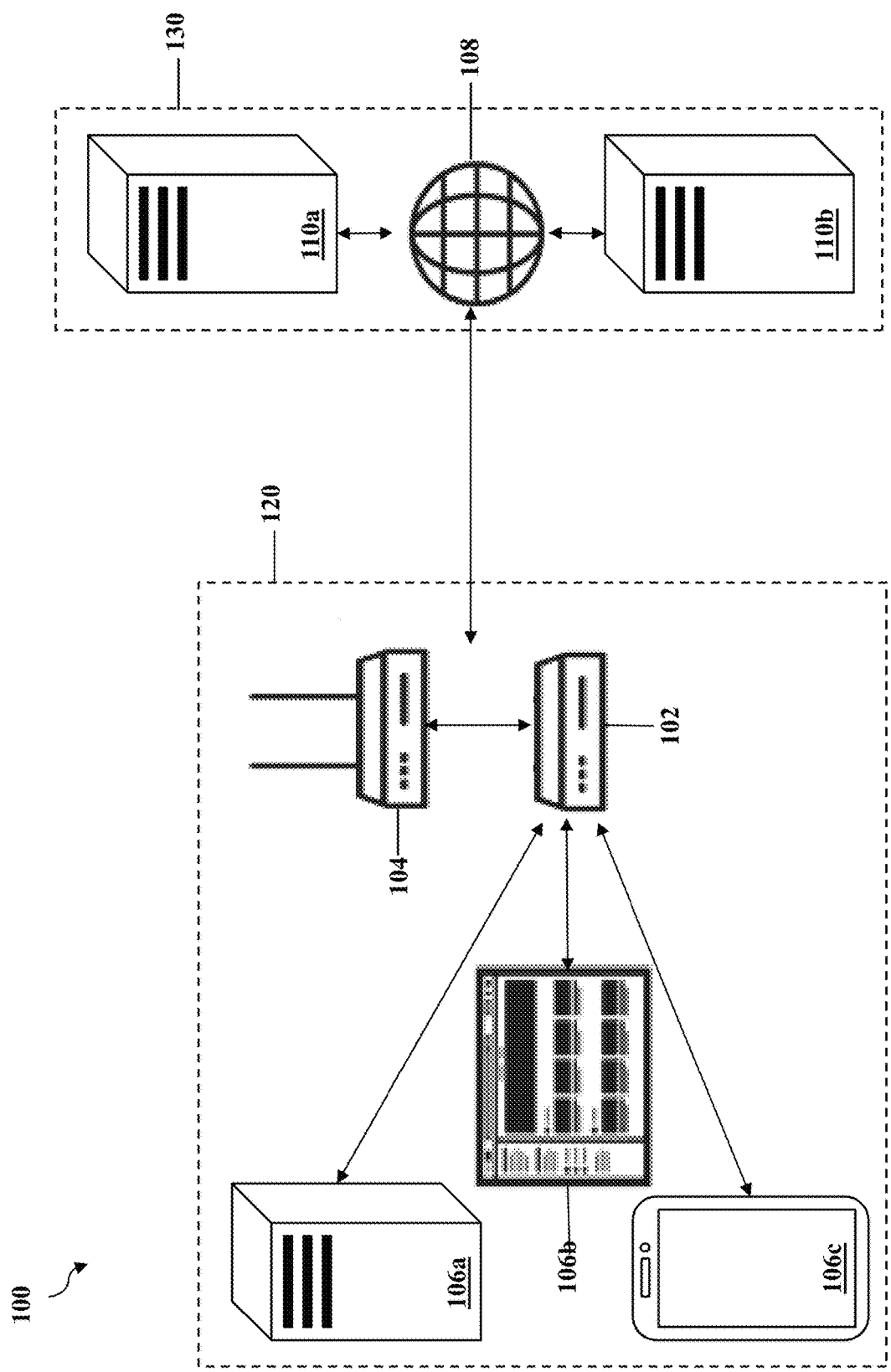
FIG. 1 is a block diagram illustrating high level system architecture for identifying network appliances by data endpoints in accordance with exemplary embodiments.

FIG. 1 illustrates a system 100 for identifying network appliances by data endpoints.

The system 100 may include a monitoring device 102. The monitoring device 102, discussed in more detail below, may be a specialized computing device that is specially configured to perform the functions discussed herein for identifying network appliances by data endpoints. It will be apparent to persons having skill in the relevant art that the monitoring device 102 may be part of another device, such as a router or endpoint device, or may be a stand-alone device, such as illustrated in FIG. 1.

The system 100 may also include a router 104 or other gateway computing device, and one or more client devices 106. Client devices 106 may be any type of computing device or program executed thereby that is an endpoint for communications in a communication network, such as a desktop computer 106*a*, web browsing application program 106b, smart phone 106c, or any other suitable type of computing device as discussed herein. The router 104 and client devices 106 may be part of a first network 120. The system 100 may also include a second network 130, which may include a large network of computing devices 110, which may be the Internet 108 or other large network of devices. The computing devices 110 may include web servers, content servers, endpoint devices, routers, etc. The router 104 may be used as a connection between the first network 120 and the second network 130, where the monitoring device 102 intercepts data that passes between the two networks. The monitoring device 102 may be considered to be a part of the first network 120 and may, in some cases, be a functionality of the router 104 as configured to perform the functions of the monitoring device 102 as discussed herein. In an embodiment, the monitoring device 102 may run on the same subnet of the first network 120 as the router 104. While the monitoring device 102 is illustrated as a part of the first network 120 in FIG. 1, it can be appreciated that the monitoring device 102 may be located outside of the first network 120. For example, the monitoring device 102 may be on a third network that sits between the first network 120 and the second network 130 and intercepts the data that passes between the first network 120 and the second network 130.

As discussed in more detail below, the monitoring device 102 may be configured to intercept communications from the first network 120 to the second network 130. Such communication interception may be used to identify the one or more computing devices 106 on the first network 120. The system 100 may be configured such that all network traffic on the first network 120 flows through the monitoring device 102. For instance, the monitoring device 102 may intercept communications from the one or more computing devices 106 on the first network 120 using any known communications interception method such as, but not limited to, ARP spoofing. Further, as discussed in more detail below, the monitoring device 102 may be configured to store information about each network communication between the client devices 106 on the first network 120 and the second network 130. For instance, the monitoring device 102 may store information such as a Client Identification ("Client Id") and a destination address. The Client Id information may include, but is not limited to, an internet protocol (IP) address, a transport layer security (TLS) signature, a server name indication (SNI) hostname, etc. The destination address information may include, but is not limited to, a domain name, and/or destination address IP, etc. The interception of network communications from the one or more computing devices 106 and storing information about those network communications enables the monitoring device 102 to identify the one or more client devices 106. As a result, the monitoring device 102 may enable users to identify known and unknown computing devices on the first network 120. The monitoring device 102 may intercept network communications that use any known communication protocol that provides a unique or semi-unique addressing for communication origin and destination endpoints such as, but not limited to, transmission control protocol (TCP) and User Datagram Protocol (UDP), etc.

Monitoring Device

Figure 2:
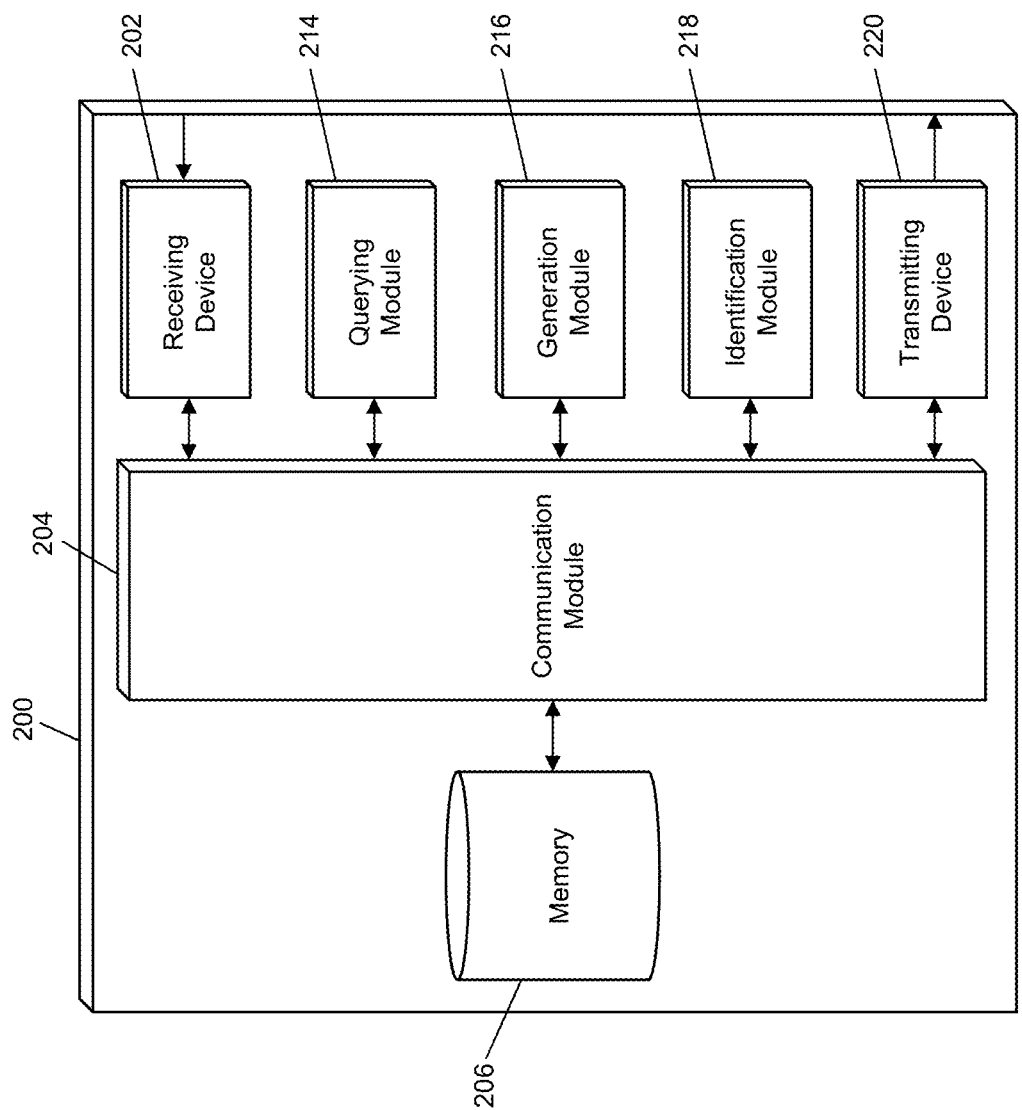
FIG. 2 is a block diagram illustrating the monitoring device of the system of FIG. 1 for identifying network appliances by data endpoints in accordance with exemplary embodiments.

FIG. 2 illustrates an embodiment of the monitoring device 102 in the system 100. It will be apparent to persons having skill in the relevant art that the embodiment of the monitoring device 102 illustrated in FIG. 2 is provided as illustration only and may not be exhaustive to all possible configurations of the monitoring device 102 suitable for performing the functions as discussed herein. For example, the computer system 400 illustrated in FIG. 4 and discussed in more detail below may be a suitable configuration of the monitoring device 102. In some cases, routers 104, client devices 106, computing devices 114, or other devices may be configured to have the components of the monitoring device 102 as illustrated in FIG. 2 and discussed below, such as in instances where such a device may also perform the functions of the monitoring device 102. For example, a router 104 may be configured to also serve as a monitoring device 102 for the first network 120. In exemplary embodiments, the monitoring device 102 is a passive listening device.

The monitoring device 102 may include a receiving device 202. The receiving device 202 may be configured to receive data over one or more networks via one or more network protocols. In some instances, the receiving device 202 may be configured to receive data from computing devices 106, the internet 108, the computing device 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network, e.g. the first network 120, and a second receiving device for receiving data via the Internet, e.g. the second network 130. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by client devices 106, router 104, computing devices 110, and other devices that are being transmitted to or from the first network 120. Such data signals may be superimposed or otherwise encoded with any type of data, such as a Client Identification, a destination address, and/or a user agent. The Client Identification, destination address, and/or a user agent may be referred to as data endpoints, as they identify a transmission origination point or transmission destination point. The Client Identification information can include, but is not limited to, an IP address if the device is on the same subnet, a TLS signature, and/or an SNI hostname. The destination address information can include, but is not limited to, a domain name, and/or an IP address of the connection. The destination address may be determined by the receiving device 202 by packet inspection and/or reverse DNS lookup of the destination IP address. For example, the receiving device 202 may be configured to receive data requests destined for or transmitted by a client device 106, such as the web browsing application program 106b. For instance, a request for a website or other resource (e.g., hypertext markup language, cascading style sheets, images, scripts, etc.) may be received by the receiving device 202 from the client device 106, where, in return, the receiving device 202 may receive the requested resources from a web server. Such resources may include tracking images and other information, such as internet protocol addresses, browser information, cookies, referring resource locators, etc.

The monitoring device 102 may also include a communication module 204. The communication module 204 may be configured to transmit data between modules, engines, databases, memories, and other components of the monitoring device 102 for use in performing the functions discussed herein. The communication module 204 may be comprised of one or more communication types and utilizes various communication methods for communications within a computing device. For example, the communication module 204 may be comprised of a bus, contact pin connectors, wires, etc. In some embodiments, the communication module 204 may also be configured to communicate between internal components of the monitoring device 102 and external components of the monitoring device 102, such as externally connected databases, display devices, input devices, etc. The monitoring device 102 may also include a processing device. The processing device may be configured to perform the functions of the monitoring device 102 discussed herein as will be apparent to persons having skill in the relevant art. In some embodiments, the processing device may include and/or be comprised of a plurality of engines and/or modules specially configured to perform one or more functions of the processing device, such as the querying module 214, the interception module 216, the identification module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The monitoring device 102 may also include a memory 206. The memory 206 may be configured to store data for use by the monitoring device 102 in performing the functions discussed herein, such as the data received from the client devices 106, e.g. the Client Identification, destination address, and/or user agent. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the monitoring device 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein. The memory 206 may be configured to store, for example, data based on transmissions intercepted from client devices 106 on the first network 120. For instance, the memory 206 may store collections of IP addresses, TLS signatures, SNI hostnames, domain names, metadata, and rules for the purpose of identifying the client devices 106.

The memory 206 may also include one or more memory caches stored therein. For example, a first memory cache may be stored in the memory 206, which may be a device identification tree. The device identification tree may be populated with rules for identifying specific devices and applications, e.g. the client devices 106, on the first network 120. Each rule in the device identification tree specifies a set of conditions which must be met to properly identify and label a client device 106. In some embodiments, the rules of the device identification tree are semantic language rules. Further, each rule consists of rule parts, which are a series of comma separated directives. A rule may have rule parts to identify a client device 106 based on the IP address, browser identification, and/or prefix match string, etc. of known client devices 106. A rule may have rule parts to identify a client device 106 based on domain endpoints, and/or IPv4 addresses. Further, a rule may have rule parts which define the minimum and maximum domains a client device 106 may have on its endpoint list, e.g. the intercepted communications from the client device 106 stored in the memory 206 of the monitoring device 102. In exemplary embodiments, the rules of the device identification tree are sorted in order of complexity such that more specific rules take precedence over less specific rules. Thus, the device identification tree can become more specific over time, enabling identification of specific devices (or applications), e.g. the client devices 106, while still supporting less specific default labels for client devices 106 which have not been seen before. The device identification tree and the rules will be described in more detail below with reference to the identification module 218 and FIG. 3.

The monitoring device 102 may include a querying module 214. The querying module 214 may be configured to execute queries on databases to identify information. The querying module 214 may receive one or more data values or query strings, and may execute a query string based thereon on an indicated database, such as the memory 206 of the monitoring device 102 to identify information stored therein. The querying module 214 may then output the identified information to an appropriate engine or module of the monitoring device 102 as necessary. The querying module 214 may, for example, execute a query on the memory 206 of the monitoring device 102 to identify a list of all destination addresses which were attempted to be contacted for each client device 106 on the first network 120.

The monitoring device 102 may also include a generation module 216. The generation module 216 may be configured to generate metadata for use by the monitoring device 102 in performing the functions discussed herein. The generation module 216 may receive instructions as input, may generate metadata based on the instructions, and may output the generated metadata to one or more modules of the monitoring device 102. For example, the generation module 216 may be configured to generate metadata for use in identifying the client devices 106 and application programs. For instance, the generation module 216 may generate a label of "browser" for a client device 106 which either contacted more than one hundred unique top level domains (TLDs), e.g. amazon.com, etc., transmits a user agent which is associated with a known browser, e.g. Mozilla, Safari, Chrome, etc., and/or has been identified by a web extension which has been installed in the browser.

The monitoring device 102 may also include an identification module 218. The identification module 218 may be configured to identify the client devices 106 on the first network 120 based on the intercepted communications from the client devices 106. The identification module 218 may compare the information intercepted from the client devices 106 to the device identification tree. For example, the identification module 218 may compare the Client Id, its metadata, and associated destination addresses to the device identification tree. If a Client Id matches all the conditions, e.g. the rule parts, of a given rule, the identification module 218 assigns a specific device label to the Client Id. For example, a rule may be "domain=voice.cti.roku.com$roku" and if the Client Id matches that rule, the identification module 218 would label the Client Id as a Roku® device. Other examples of rules and resulting Client Id identifications are:

client=~browser,
    domain=bugyo.hac.Ip1.eshop.nintendo.net$nintendo switch
client=~browser,
    domain=wup.shop.nintendo.net|cdn.nintendo.net|app.nintendo. net$nintendo switch
client=~ip,
    domain=accounts.nintendo.com|cdn.nintendo.net|eshop.nintendo.net, domainmax=50$nintendo switch
    A set of overlapping rules which label a particular Client Id as a Nintendo Switch
client=~browser,domainmin=1000$device=Browser,
    Labels a device as a browser, which was not previously identified as a browser
client=~browser,domain=gateway.ifit.com|gateway-cache.ifit.com$iFit Treadmill
    Correctly identifies a device as an iFit treadmill, while excluding any browsers which connect to the same endpoint
client=~browser,domain=edge-mqtt.facebook.com, domainmax=3$device=Hidden Facebook Tracking Service
    Identifies a hidden application running on mobile devices which is known to surreptitiously send user data to Facebook The monitoring device 102 may also include a transmitting device 220. The transmitting device 220 may be configured to transmit data over one or more networks via one or more network protocols. In some instances, the transmitting device 220 may be configured to transmit data to the router 104, the client devices 106, the internet 108, the computing devices 110, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network, e.g. the first network 120, and a second transmitting device for transmitting data via the Internet, e.g. the second network 130. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

Exemplary Method for Identifying Network Appliances by Data Endpoints

Figure 3:
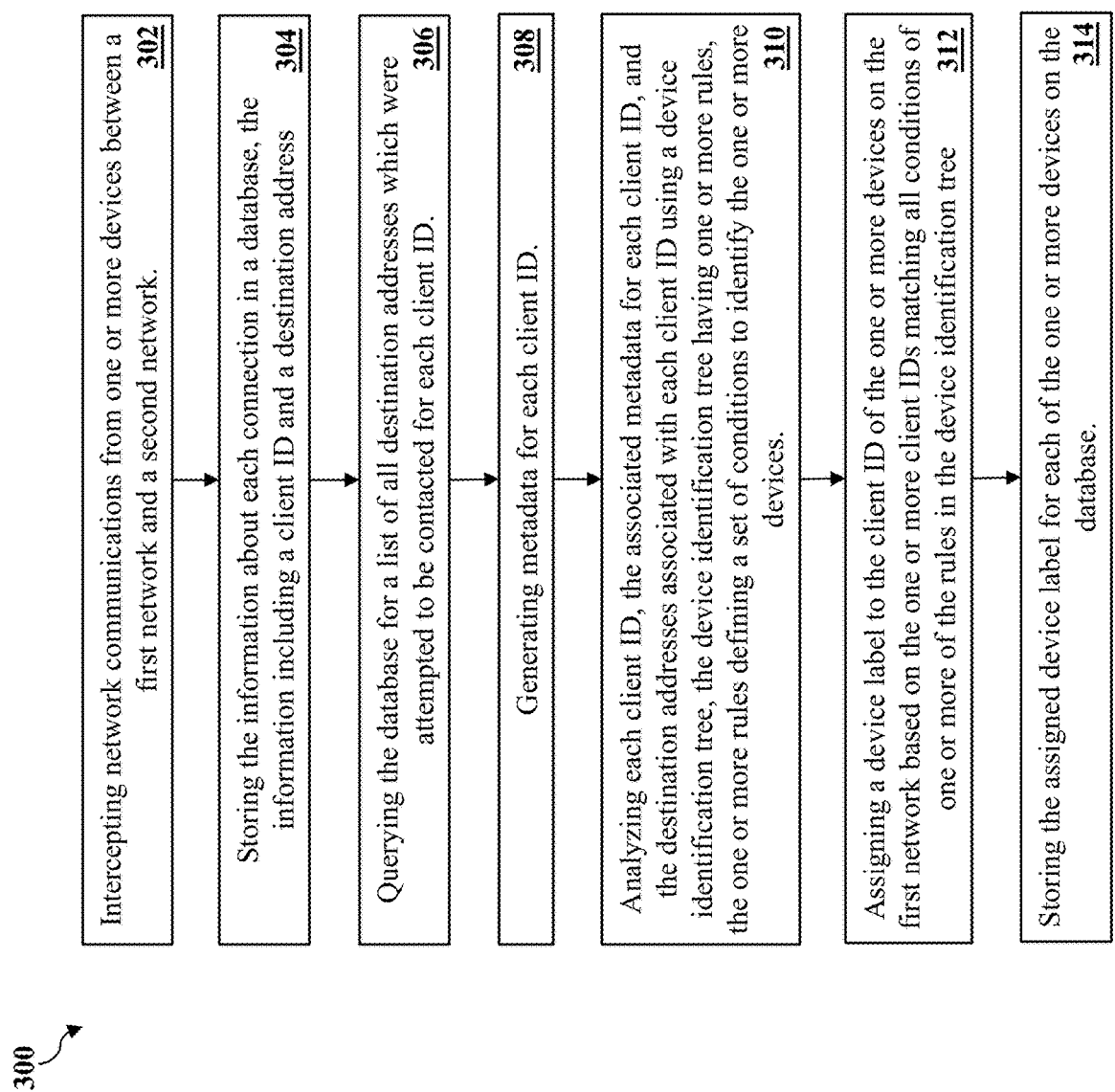
FIG. 3 is a flowchart illustrating exemplary methods for identifying network appliances by data endpoints in accordance with exemplary embodiments.

FIG. 3 illustrates a method 300 for identifying network appliances by data endpoints in accordance with exemplary embodiments.

In an exemplary embodiment, the method 300 includes block 302 for intercepting network communications from one or more devices between a first network and a second network. For example, the monitoring device 102 may intercept (e.g., by the receiving device 202) network communications between one or more client devices 106 on the first network 120 and the Internet 108 and/or computing devices 110 on the second network 130. The monitoring device 102 may intercept the network communications between the first network 120 and the second network 130 using ARP spoofing or any other suitable communications interception method.

In an exemplary embodiment, the method 300 includes block 304 for storing information about each connection in a database, the information including a Client Id and a destination address. For example, the monitoring device 102 may store (e.g. in the memory 206) information about a network communication between the client device 106a and the computing device 110a, which may include information such as, but not limited to, a Client Id of the client device 106, an IP address of the client device 106, a user agent of the client device 106, and/or a destination address of the computing device 110. The monitoring device 102 may determines the destination address based on packet inspection and/or reverse DNS lookup of the destination IP address.

In an exemplary embodiment, the method 300 includes block 306 for querying the database for a list of all destination addresses which were attempted to be contacted for each Client Id. For example, the monitoring device 102 may query (e.g. via the querying module 214) the database (e.g. the memory 206) for a list of all destination addresses which the one or more client devices 106 attempted to communicate with.

In an exemplary embodiment, the method 300 includes block 308 for generating metadata for each Client Id. For example, the monitoring device 102 (e.g. via the generation module 216) may generate metadata to apply a label to a Client Id based on certain conditions. For instance, the monitoring device 102 (e.g. via the generation module 216) may generate metadata to apply a label of "browser" to a Client Id which either contacted more than one hundred unique top level domains (TLDs), e.g. amazon.com, etc., transmitted a user agent which is associated with a known browser, e.g. Mozilla, Safari, Chrome, etc., and/or was identified by a web extension which has been installed in the browser.

In an exemplary embodiment, the method 300 includes block 310 for Analyzing the each Client Id, the associated metadata for each Client Id, and the destination addresses associated with each Client Id using a device identification tree, the device identification tree having one or more rules, the one or more rules defining a set of conditions to identify the one or more devices. For example, the monitoring device 102 (e.g. via the identification module 218) may analyze each Client Id together with the metadata associated with each Client Id, and the destination addresses associated with each Client Id using the rules of the device identification tree.

In an exemplary embodiment, the method 300 includes block 312 for assigning a device label to the Client Id of the one or more devices on the first network based on the one or more Client Ids matching all conditions of one or more of the rules in the device identification tree. For example, the monitoring device 102 (e.g., via the identification module 218) may assign a device label, e.g. Roku®, to a Client Id for the client device 106a based on the Client Id for the device 106a matching all conditions of a rule in the device identification tree identifying a Roku® device. For instance, the client device 106a may have transmitted a data request to a Roku® streaming server, e.g. the computing device 110a, for streaming content, and based on the data endpoint, e.g. Roku® streaming server, the device identification tree can identify the client device 106a as a Roku® device. In an exemplary embodiment, the device label assigned to the Client Id is the device label associated with the most complex rule in the device identification tree which the Client Id completely matches.

In an exemplary embodiment, the method 300 includes block 314 for storing the assigned device label for each of the one or more devices on the database. For example, the monitoring device 102 may store the assigned device label for the one or more client devices 106 in the memory 206.

Computer System Architecture

FIG. 4 illustrates a computer system 400 in which embodiments of the present disclosure, or portions thereof, may be implemented as computer-readable code. For example, the monitoring device 102, router 104, client devices 106, and computing devices 110 of FIG. 1 may be implemented in the computer system 400 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIG. 3.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores," The terms "computer program medium," "non-transitory computer readable medium," and "computer usable medium" as discussed herein are used to generally refer to tangible media such as a removable storage unit 718, a removable storage unit 422, and a hard disk installed in hard disk drive 412.

Various embodiments of the present disclosure are described in terms of this example computer system 400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose or a general purpose processor device specifically configured to perform the functions discussed herein. The processor device 404 may be connected to a communications infrastructure 406, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 400 may also include a main memory 408 (e.g., random access memory, read-only memory, etc.), and may also include a secondary memory 410. The secondary memory 410 may include the hard disk drive 412 and a removable storage drive 414, such as a floppy disk drive, a magnetic tape drive, an optical disk drive, a flash memory, etc.

The removable storage drive 414 may read from and/or write to the removable storage unit 418 in a well-known manner. The removable storage unit 418 may include a removable storage media that may be read by and written to by the removable storage drive 414. For example, if the removable storage drive 414 is a floppy disk drive or universal serial bus port, the removable storage unit 418 may be a floppy disk or portable flash drive, respectively. In one embodiment, the removable storage unit 418 may be non-transitory computer readable recording media.

In some embodiments, the secondary memory 410 may include alternative means for allowing computer programs or other instructions to be loaded into the computer system 400, for example, the removable storage unit 422 and an interface 420. Examples of such means may include a program cartridge and cartridge interface (e.g., as found in video game systems), a removable memory chip (e.g., EEPROM, PROM, etc.) and associated socket, and other removable storage units 422 and interfaces 420 as will be apparent to persons having skill in the relevant art.

Data stored in the computer system 400 (e.g., in the main memory 408 and/or the secondary memory 410) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 400 may also include a communications interface 424. The communications interface 424 may be configured to allow software and data to be transferred between the computer system 400 and external devices. Exemplary communications interfaces 424 may include a modem, a network interface (e.g., an Ethernet card), a communications port, a PCMCIA slot and card, etc. Software and data transferred via the communications interface 424 may be in the form of signals, which may be electronic, electromagnetic, optical, or other signals as will be apparent to persons having skill in the relevant art. The signals may travel via a communications path 426, which may be configured to carry the signals and may be implemented using wire, cable, fiber optics, a phone line, a cellular phone link, a radio frequency link, etc.

The computer system 400 may further include a display interface 402. The display interface 402 may be configured to allow data to be transferred between the computer system 400 and external display 430. Exemplary display interfaces 402 may include high-definition multimedia interface (HDMI), digital visual interface (DVI), video graphics array (VGA), etc. The display 430 may be any suitable type of display for displaying data transmitted via the display interface 402 of the computer system 400, including a cathode ray tube (CRT) display, liquid crystal display (LCD), lightemitting diode (LED) display, capacitive touch display, thin-film transistor (TFT) display, etc.

Computer program medium and computer usable medium may refer to memories, such as the main memory 408 and secondary memory 410, which may be memory semiconductors (e.g., DRAMs, etc.). These computer program products may be means for providing software to the computer system 400. Computer programs (e.g., computer control logic) may be stored in the main memory 408 and/or the secondary memory 410. Computer programs may also be received via the communications interface 424. Such computer programs, when executed, may enable computer system 400 to implement the present methods as discussed herein. In particular, the computer programs, when executed, may enable processor device 404 to implement the methods illustrated by FIG. 3, as discussed herein. Accordingly, such computer programs may represent controllers of the computer system 400.

Where the present disclosure is implemented using software, the software may be stored in a computer program product and loaded into the computer system 400 using the removable storage drive 414, interface 420, and hard disk drive 412, or communications interface 424.

The processor device 404 may comprise one or more modules or engines configured to perform the functions of the computer system 400. Each of the modules or engines may be implemented using hardware and, in some instances, may also utilize software, such as corresponding to program code and/or programs stored in the main memory 408 or secondary memory 410. In such instances, program code may be compiled by the processor device 404 (e.g.; by a compiling module or engine) prior to execution by the hardware of the computer system 400. For example, the program code may be source code written in a programming language that is translated into a lower level language, such as assembly language or machine code, for execution by the processor device 404 and/or any additional hardware components of the computer system 400. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 400 to perform the functions disclosed herein. It will be apparent to persons having skill in the relevant art that such processes result in the computer system 400 being a specially configured computer system 400 uniquely programmed to perform the functions discussed above.

Techniques consistent with the present disclosure provide, among other features, systems and methods for unique identifying a network client or application based on a transport layer security handshake. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for identifying network appliances on a network, the method comprising:
   intercepting network communications from one or more devices on a first network in communication with a second network;
   storing information about each communication in a database, the information including a Client Id and a destination address;
   querying the database for a list of all destination addresses which were attempted to be contacted for each Client Id;
   generating metadata for each Client Id;
   analyzing each Client Id, the associated metadata for each Client Id, and the destination addresses associated with each Client Id using a device identification tree, the device identification tree having one or more rules, the one or more rules defining a set of conditions to identify the one or more devices; and
   assigning a device label to the Client Id of the one or more devices on the first network based on the one or more Client Ids matching all conditions of one or more of the rules in the device identification tree.

2. The method as claimed in claim 1, comprising:
   storing the assigned device label for each of the one or more devices on the database.

3. The method as claimed in claim 1, wherein the network communications from the one or more devices on the first network in communication with the second network are intercepted using arp spoofing.

4. The method as claimed in claim 1, wherein the destination address is determined using packet inspection.

5. The method as claimed in claim 1, wherein the destination address is determined using reverse DNS lookup of the destination IP address.

6. The method as claimed in claim 1, wherein each of the one or more rules has one or more rule parts, each rule part having a series of semantic language directives.

7. The method as claimed in claim 6, wherein the one or more rules are sorted in order of descending complexity, the complexity of the rule being based on the number of rule parts.

8. The method as claimed in claim 7, wherein the device label assigned to each of the one or more devices is based on the most complex rule each device satisfies the set of conditions of.

9. A system for identifying network appliances on a network, the system comprising:
   one or more processors, one or more computer-readable memories, one or more computer-readable tangible storage devices, and instructions stored on at least one of the one or more storage devices for execution by at least one of the one or more processors via at least one of the one or more memories, the instructions comprising:
   instructions to intercept network communications from one or more devices on a first network in communication with a second network;
   instructions to store information about each communication in a database, the information including a Client Id and a destination address;
   instructions to query the database for a list of all destination addresses which were attempted to be contacted for each Client Id;
   instructions to generate metadata for each Client Id;
   instructions to analyze each Client Id, the associated metadata for each Client Id, and the destination addresses associated with each Client Id using a device identification tree, the device identification tree having one or more rules, the one or more rules defining a set of conditions to identify the one or more devices; and instructions to assign a device label to the Client Id of the one or more devices on the first network based on the one or more Client Ids matching all conditions of one or more of the rules in the device identification tree.

10. The system as claimed in claim 9, comprising:
instructions to store the assigned device label for each of the one or more devices on the database.

11. The system as claimed in claim 9, wherein the network communications from the one or more devices on the first network in communication with the second network are intercepted using arp spoofing.

12. The system as claimed in claim 9, wherein the destination address is determined using packet inspection.

13. The system as claimed in claim 9, wherein the destination address is determined using reverse DNS lookup of the destination IP address.

14. The system as claimed in claim 9, wherein each of the one or more rules has one or more rule parts, each rule part having a series of semantic language directives.

15. The system as claimed in claim 14, wherein the one or more rules are sorted in order of descending complexity, the complexity of the rule being based on the number of rule parts.

16. The system as claimed in claim 15, wherein the device label assigned to each of the one or more devices is based on the most complex rule each device satisfies the set of conditions of.

17. A computer program product for identifying network appliances on a network, the computer program product comprising:
a non-transitory computer-readable storage medium having program instructions embodied therewith, the program instructions executable by a computer to cause the computer to perform a method, comprising:
intercepting network communications from one or more devices between on a first network in communication on a second network;
storing information about each communication in a database, the information including a Client Id and a destination address;
querying the database for a list of all destination addresses which were attempted to be contacted for each Client Id;
generating metadata for each Client Id;
analyzing each Client Id, the associated metadata for each Client Id, and the destination addresses associated with each Client Id using a device identification tree, the device identification tree having one or more rules, the one or more rules defining a set of conditions to identify the one or more devices; and
assigning a device label to the Client Id of the one or more devices on the first network based on the one or more Client Ids matching all conditions of one or more of the rules in the device identification tree.

18. The computer program product as claimed in claim 17, wherein each of the one or more rules has one or more rule parts, each rule part having a series of semantic language directives.

19. The computer program product as claimed in claim 18, wherein the one or more rules are sorted in order of descending complexity, the complexity of the rule being based on the number of rule parts.

20. The computer program product as claimed in claim 19, wherein the device label assigned to each of the one or more devices is based on the most complex rule each device satisfies the set of conditions of.

* * * * *